United States Patent [19]

Hollinger et al.

[11] Patent Number: 4,509,170

[45] Date of Patent: Apr. 2, 1985

[54] TIME DIVISION MULTIPLEX TRANSMISSION OF SUBMULTIPLEX SEQUENCES OF SIGNALS FROM SECTIONS OF A CHAIN OF DATA ACQUISITION UNITS

[75] Inventors: David P. Hollinger, Kendall; David E. Nelson; Robert J. Hannon, both of Rochester, all of N.Y.

[73] Assignee: Hydroacoustics Inc., Rochester, N.Y.

[21] Appl. No.: 350,903

[22] Filed: Feb. 22, 1982

[51] Int. Cl.³ .............................................. H04J 3/06
[52] U.S. Cl. ..................................... 370/85; 370/103; 340/870.13; 367/79
[58] Field of Search ................... 370/100, 85, 103, 86; 340/858, 870.13; 367/79

[56] References Cited

U.S. PATENT DOCUMENTS

| | | | |
|---|---|---|---|
| 3,748,638 | 7/1973 | Montgomery | 340/15.5 MC |
| 3,851,302 | 11/1974 | Schmitt | 340/15.5 TS |
| 3,873,961 | 3/1975 | Lee et al. | 340/15.5 TS |
| 3,911,226 | 10/1975 | Angelle et al. | 370/108 |
| 3,986,162 | 10/1976 | Cholez et al. | 340/15.5 TS |
| 3,990,036 | 11/1976 | Sabit | 340/15.5 TS |
| 3,993,870 | 11/1976 | Schwartz | 370/100 |
| 3,996,553 | 12/1976 | Siems et al. | 340/15.5 TS |
| 4,005,273 | 1/1977 | Siems | 179/15 BL |
| 4,010,326 | 3/1977 | Schwartz | 370/100 |
| 4,023,140 | 5/1977 | Siems et al. | 367/79 |
| 4,053,714 | 10/1974 | Long | 370/100 |
| 4,072,923 | 2/1978 | Siems et al. | 340/15.5 TS |
| 4,089,584 | 5/1978 | Polozynski | 350/96.16 |
| 4,092,629 | 5/1978 | Siems et al. | 340/15.5 TS |
| 4,107,518 | 8/1978 | McMahon | 250/199 |
| 4,117,448 | 9/1978 | Siems | 340/15.5 TS |
| 4,218,767 | 8/1980 | Joosten et al. | 370/91 |
| 4,234,968 | 11/1980 | Singh | 455/607 |
| 4,301,522 | 11/1981 | Guyot et al. | 367/123 |

OTHER PUBLICATIONS

Prentice-Hall Signal Processing Series, "Digital Filters", Hamming; 1977, Section 13-5.
Applied Optics, vol. 19, No. 12, "Passive Multiplexing System for Fiber-Optic Sensers"; Nelson et al., pp. 2917-2920, Sep. 80.
EG and G Reticon, Product Summary Discrete Time Analog Signal Processing Devices, "Charge Transfer Devices", 1977.
EG and G Reticon, Product Summary Discrete Time Analog Signal Processing Devices, "Charge Transfer Devices(Ltd)", McMahon, 1975.

*Primary Examiner*—Douglas W. Olms
*Assistant Examiner*—Frank M. Scutch, III
*Attorney, Agent, or Firm*—Martin LuKacher

[57] ABSTRACT

Time Division Multiplex (TDM) telemetry of submultiplex sequences of signals which may be obtained from successive sections of sensors in a sensor array are transmitted synchronously by locking generators in each section, which determine the time slots in which samples of the sensor signals from each sensor in the array may be transmitted, to successive synchronizing pulses which are generated in the section of the array furthest from the head end of the array where the telemetered signals are received. The synchronizing signals are transmitted once per scan of all of the sensors in the array and phase or time the operation of clock generators and counters which establish the timing so that neither the time slots nor the sensor data signals which are transmitted therein to the collection point at the head end of the array interfere with one another. The sensor array may be a seismic array such as a seismic streamer or spread used in geophysical exploration. Data signals from groups of sensors associated with different data acquisition units of a chain of such units may also be telemetered in synchronous sequences during repetitive scans or frames. Each section or module of the system may be identical and can provide the synchronizing pulses to succeeding section if a preceding unit fails to provide the synchronizing signals.

15 Claims, 3 Drawing Figures

TIME DIVISION MULTIPLEX TRANSMISSION OF SUBMULTIPLEX SEQUENCES OF SIGNALS FROM SECTIONS OF A CHAIN OF DATA ACQUISITION UNITS

DESCRIPTION

The present invention relates to time division telemetry wherein sequences of signals are relayed in time division multiplex relationship to a data collection point, and particularly to a time division multiplex telemetry system wherein the sequences of signals are all in synchronous relationship with timing signals generated in a section of the system most distant from a data collection point.

The invention is especially suitable for use in telemetering signals from an array of seismic sensors, such as hydrophones in a seismic streamer or geophones in a seismic spread. The invention is also applicable generally to data acquisition from chains of data acquisition units which may be used in industrial process control, as well as sonar systems, and any other systems in which data is collected and signals are received from a large number of channels.

This invention is related to the invention described in patent application Ser. No. 074,268 entitled Sensor System with Time Division Multiplex Telemetry filed Sept. 11, 1979 in the name of David E. Nelson and David M. Berg now U.S. Pat. No. 4,313,192, issued Jan. 26, 1982. That application describes a fiber optic telemetry system in a seismic sensor array. Data samples are transmitted by submultiplexing signals from sub-arrays in successive sections of the array extending from the tail to the head end of the array where the signals are collected and received. In a seismic streamer array, the head end is closest to the vessel which tows the array through the water. The submultiplex sequences are generated in series connected telemetry modules in response to synchronization signals transmitted from the tail end of the array. These synchronization signals are a scan synchronizing pulse and sweep synchronizing pulses. The scan synchronizing pulse repeats during each scan of all of the sections and sub-arrays and initializes the telemetry modules at the start of a scan. As many sweep synchronizing pulses are transmitted as there are sections with telemetry modules. A sweep synchronizing pulse causes each module to transmit a data signal from a sensor channel in its associated sub-array and advance the submultiplex sequence to a succeeding channel. The output of this system which is received at the data collection or reception point at the head end of the array is made up, during each scan, of the scan synchronization pulse followed by scan acknowledgment pulses from each section and then followed by trains of data signals, each train following a sweep synchronizing pulse. The time slots in the time division multiplex (TDM) sequence are generated by free running devices. The acknowledgment pulses and the data signals are not each synchronized with a common clock. By allowing adequate guard time, drifts of the time slots can be accommodated within the timing tolerance of the system. It is, however, desirable that a synchronous sequence of time slots locked to an accurate and equally spaced clock sequence be afforded.

The problem of synchronous transmission may readily be solved through the use of a separate control or synchronization channel extending from the head end of the system to each of the sections. This requires two way transmission of control and data signals. The delay for the two way propagation of signals along the array is undesirable. Therefore, it becomes necessary to solve the problem of synchronizing the time slots using synchronizing signals which propagate with the data signals from the tail end to the head end of the array. To solve this problem it has been proposed to use highly stable local clocks in each section or module of the system. The clocks are not synchronized; accordingly, the time slots in which data can be transmitted are not locked to an accurate equally spaced clock sequence as desired. This proposed system is described in U.S. Pat. No. 3,748,638 issued July 24, 1973. The problem of the lack of synchronization therein is discussed in U.S. Pat. No. 3,873,961 issued Mar. 25, 1975 which also describes a return to the use of synchronization signals transmitted from the head end of the array, particularly on power cables which are connected to the telemetry modules in the successive sections. It has also been proposed to generate trains of local clock signals in the telemetry modules of each section upon receipt of synchronizing signals. All of the local clocks are not locked to a common clock sequence such that the time slots in each section of the system are synchronous as desired. (See U.S. Pat. No. 3,986,162, issued Oct. 12, 1976).

Accordingly, it is a principal object of the present invention to provide an improved telemetry system in which signals in different sections are time division multiplexed into a stream of signals transmitted to a collection point wherein the time slots for the transmission of these signals in each section are synchronous with an accurate and equally spaced sequence of timing signals from the same stream of signals.

It is another object of the present invention to provide an improved telemetry system wherein time division multiplexed data is transmitted from different acquisition units which are connected in tandem by transmission line links, and wherein interference between successive data signals is prevented.

It is the still further object of the invention to provide an improved TDM telemetry system wherein a plurality of channels is submultiplexed in different sections of the system in time slots which are synchronous with one another in each section.

It is a still further object of the present invention to provide an improved TDM telemetry system wherein a plurality of channels is submultiplexed in different sections of the system and which enables the use of identical telemetry modules or units in each section.

It is still another object of the present invention to provide an improved TDM telemetry system which prevents interference caused by transmission of data during overlapping times or time slots without the need for separate timing or synchronization channel.

It is still another object of the present invention to provide an improved TDM telemetry system wherein different modules or units are interconnected in a chain and wherein the timing of the transmission of the submultiplex sequences is accurately controlled through the use of available low cost clock sources and without the need of expensive frequency standards.

It is a still further object of the present invention to provide an improved TDM telemetry system having a plurality of sections at which data is acquired which are connected in tandem successively further away from a data collection point, wherein the unit furthest away from the data collection point controls the synchronous operation of all of the units and wherein control of synchronization is automatically taken over by units closer to the collection point if a preceding unit further away from the collection point fails, thereby enhancing system reliability.

Briefly described, an improved TDM telemetry system in accordance with the invention is operative to allocate successive time slots to each section of the system. At each section data from a plurality of channels may be submultiplexed and transmitted in time slots allocated to that section. In each section, all of the available time slots are generated and are synchronized once during each scan (each of the channels in each of the sections is sampled once during a scan) so that the time slots are locked to an accurate and equally spaced clock sequence in precisely timed phase relationships with each other. The telemetry system thus enables data collected at a plurality of sections to be time division multiplexed and transmitted to a receiving point. Each of the sections has means for generating a sequence of time slots for the transmission of synchronizing signals and data signals for all of the sections. Even though all of the time slots are not used for data or for synchronizing signals in each section, they are nevertheless generated therein and locked in desired phase relationship to the synchronizing signals from the section most remote from the data collection point. Each section thus includes means, responsive to the reception of the signals from a preceding section, for synchronizing the time slots generated therein with the time slot sequence of the preceding section. Each section also includes means for transmission of the signals therefrom and from the preceding section in time division multiplex relationship in different ones of the time slots. There is no interference between the data since the time slots used by a preceding section and the time slots used by the succeeding sections are all synchronous and non-overlapping.

The foregoing and other features, objects and advantages of the invention as well as a presently preferred embodiment thereof will become more apparent from a reading of the following description in connection with the accompanying drawings in which.

Figure 1:
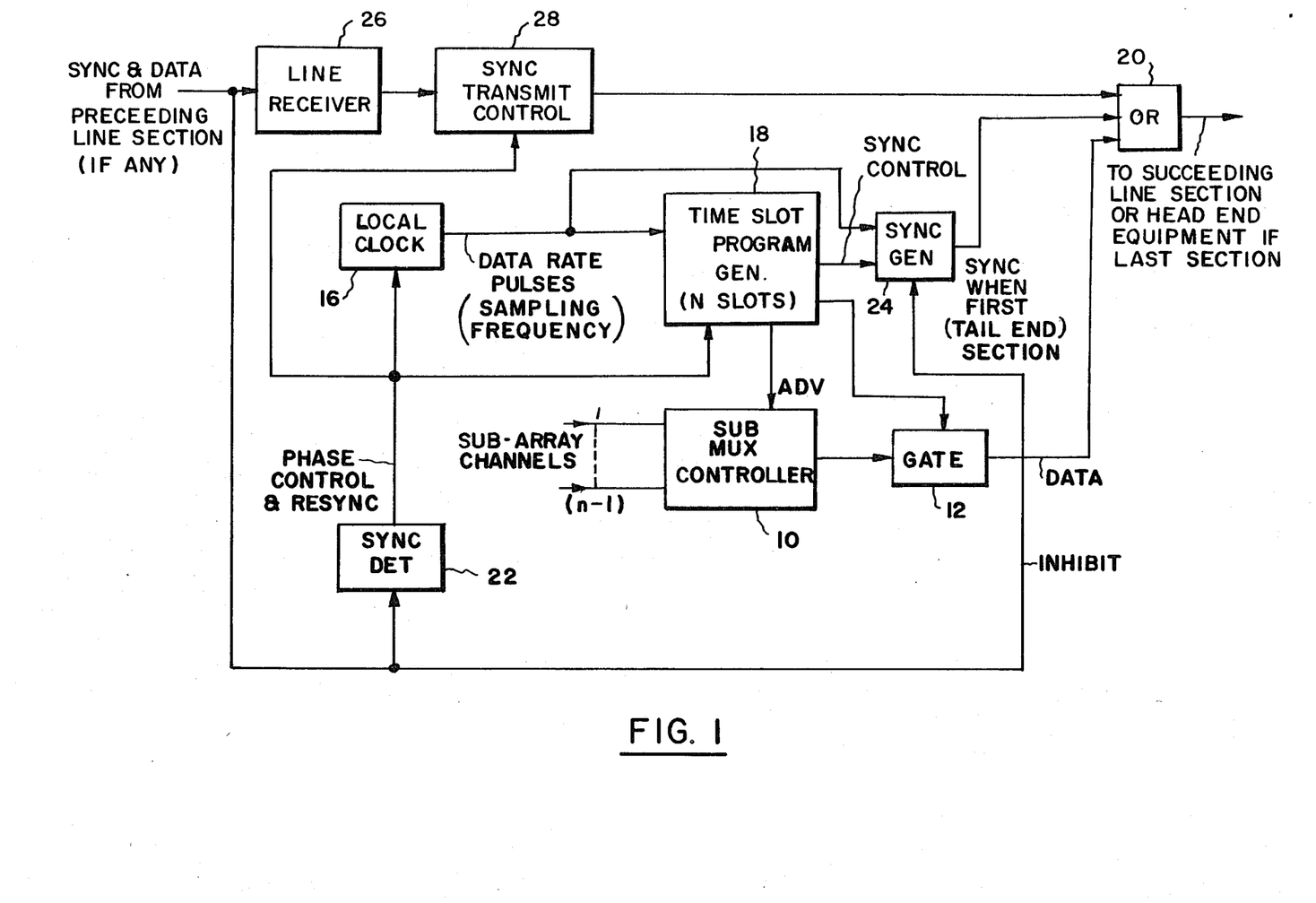
FIG. 1 is a block diagram showing a section or telemetry module of a TDM telemetry system embodying the invention.

This section of the TDM telemetry system, which is shown in FIG. 1, contains a telemetry unit or module and is associated with a sub-array of sensors. In a seismic system where the sensors are in a seismic streamer as described in the above referenced application which is filed in the name of David E. Nelson and David M. Berg, the sensors are hydrophones. These hydrophones are arranged successively in the sub-arrays of each section. Each channel may be connected to a group of paralleled sensors. The channels are submultiplexed by means of a submultiplex controller 10 which is advanced to the next channel after a data signal from the channel is sampled by means of a gate 12. The submultiplex controller and gate desirably transmit pulse frequency modulated (PFM) samples which are generated in a voltage controlled oscillator (14, FIG. 2) in response to analog data from the sub-array channels. The submultiplexing and sampling of the data is preferably carried out in a manner to increase the signal to noise ratio of the transmission as described in the above referenced patent application of David E. Nelson and David M. Berg.

The sections are preferably linked by a fiber optic transmission line. The signals are converted from optical to electrical form at the input to the telemetry module and at the output thereof, as described in the above referenced Nelson and Berg application. Only the electrical portion of the telemetry module is illustrated herein since the optical to electrical conversion forms no part of this invention. A typical telemetry module is illustrated in FIG. 1. Synchronization and data signals are received from a preceding line section, if any, and transmitted to a succeeding line section or the head end equipment, if the telemetry module is associated with the last (closest to collection point) section of the system. The head end equipment includes the demodulators and the demultiplexers and filters for restoring each of the channel signals from the data signals which are transmitted along the line during successive scans. The scans may recur at a high rate, for example, 10 KHz as described in the above referenced Nelson and Berg application. Demultiplexing is carried out under the control of the synchronizing signals in the TDM stream which is relayed between telemetry modules along their interconnecting transmission line links.

Each telemetry module has an accurate digital clock 16. An oscillator or clock pulse generator of this clock is provided with an accuracy which is approximately one order of magnitude more accurate, on a percentage basis, than the number of sensors in the array. If, for instance, data from 1,000 sensor channels is to be sampled and transmitted to the data collection or receiving point at the head end of the system, then the accuracy of each clock must be approximately one part in ten thousand. Available crystal control clock oscillators which are conventionally used in data processing systems have at least such an accuracy. Accordingly, simple and economical circuits may be used in implementing the invention.

Associated with each clock is a time slot program generator 18 which repeatedly generates N time slots, where N is four more than the total number of sections in the system. During each group of N time slots, a different channel from each section is transmitted. Each scan starts with a synchronization interval followed by n data intervals (where n is one more than the number of channels in each section), with a group of N time slots in each interval. In the first of these groups of N time slots, all of the channel 1 data from each section is transmitted. In the second group of N time slots, the channel 2 data from each section is transmitted. Transmissions continue during the remaining of the n groups of time slots such that during the nth time slot group the data from the last channel in each sub-array is transmitted.

The time slot program generator 18 counts the data rate pulses from the local clock 16 and outputs time slots (which also may be viewed as phase states) equal to or exceeding the total number of channels in the system plus the number of telemetry modules. The generator 18 is capable of outputting a regular sequence of sync pulses which are equally spaced and which are used to first output a data signal by enabling the gate 12 which transmits the data to the line via an OR gate 20.

The generator 18 then advances the submultiplex controller 10. Each clock 16 and program generator 18 are adjusted in phase in accordance with the phasing sequence of synchronizing pulses which is transmitted once per scan in the synchronizing interval. This synchronizing pulse sequence is received from the preceding line section and detected by a sync detector 22. The sync detector controls the local clock and the program generator 18 to adjust its phase in accordance with the transmitted phasing sequence. In the event that the sync signals are not received, a sync generator 24, which is normally inhibited when sync and data signals are received from the preceding section, takes over automatically to generate synchronizing signals to which all of the time slots in the succeeding line section telemetry modules are then synchronized or locked.

Synchronizing and data signals from the preceding sections are amplified in a line receiver 26. The transmission of synchronizing pulses is controlled by a sync transmit control gate 28, such that the sync pulses which are transmitted to the succeeding line section will accurately define the phasing sequence of the time slots generated therein. The OR gate 20 passes the sync and data from the preceding line section in their respective time slots and also the sub-array channel data which is submultiplexed by the controller 10 and sampling gate 12. When sync signals are generated by the sync generator 24, they are transmitted through the OR gate 20 during the time slots of the sync interval. Amplification may be provided after the OR gate 20 as part of the electrical to optical conversion process.

Figure 3:
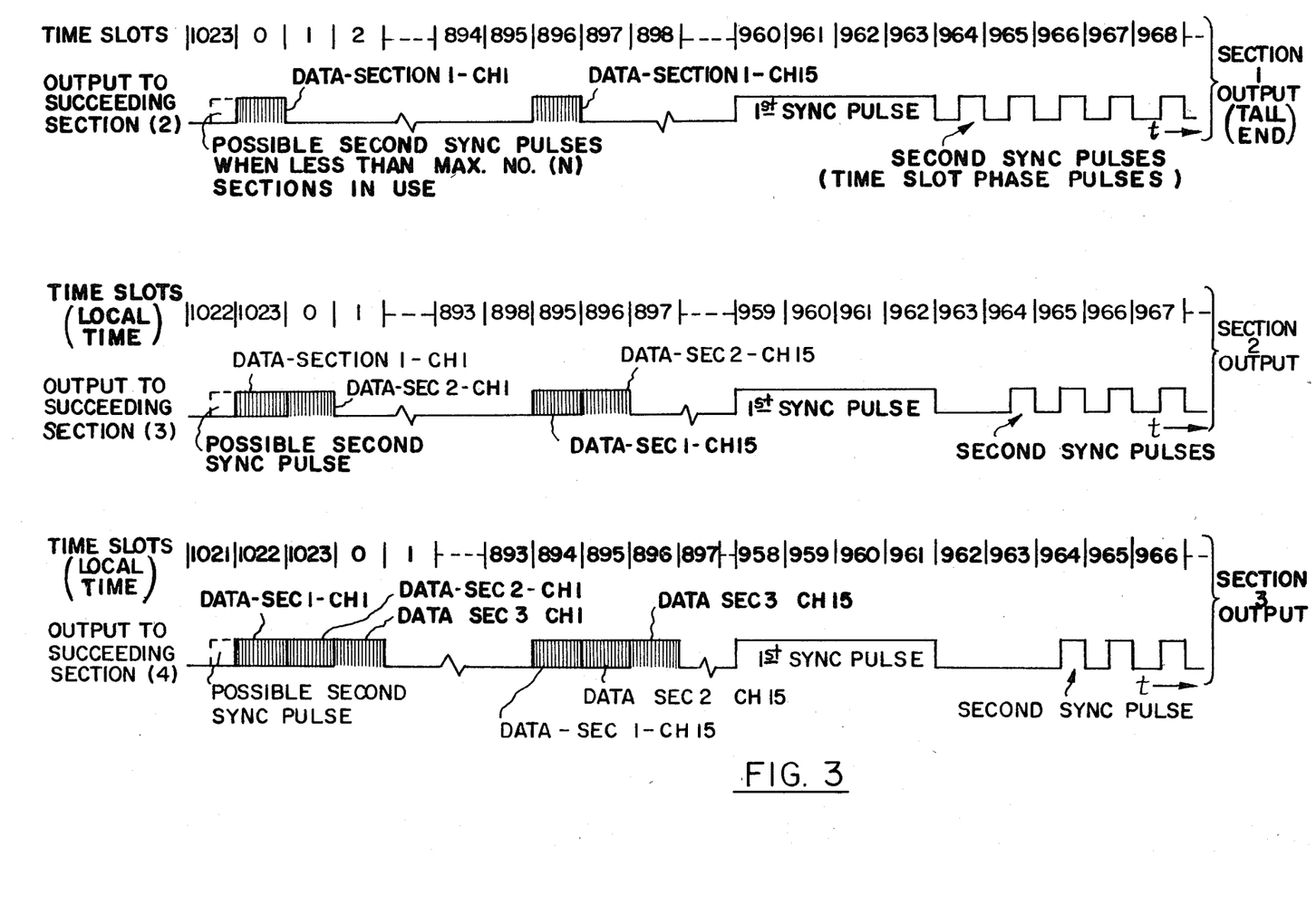
FIG. 3 is a timing diagram illustrating the time slots generated and used in three sections, namely, the section most remote from the receiving point (the tail end section), and two sections succeeding the tail end section.

Consider first that the telemetry module shown in FIG. 1 is in the last section at the tail end of the array. Hence, there are no sync or data signals from any preceding section. The clock 16 becomes, by default, the originator of the system timing. It outputs both sync pulses, and data pulses in accordance with the pre-programed time slots of specified phase angles from its time slot program generator 18. As shown in FIG. 3, the generator 18 of the tail end section telemetry module generates a phasing sequence of sync pulses consisting of a block of steady high level as the first sync pulse followed by second sync pulses at every possible time slot or phase angle for the maximum number of sections used in the system, i.e., N, second sync pulses. The succeeding telemetry module of the next to most distant section receives this sequence of sync pulses from the clock of the most distant telemetry module. Its sync detector responds to the sequence of sync pulses by synchronizing its clock and its time slot program generator to the first sync pulse, erases or deletes the first of the second sync pulses and passes the remainder of the second sync pulses to the next succeeding section. The section 2 output in FIG. 3 shows the deletion of the first of the second sync pulses. The process repeats through every section in the system. FIG. 3 also shows the section 3 output; the sync detector 22 of the third module operating the sync transmit control 28 of the section 3 telemetry module to delete the first to occur of the second sync pulses which the section 3 module receives. Accordingly, at the output of the section 3 module, the first two second sync pulses are deleted. At the conclusion of this synchronization process, when the clock in the Nth module has been synchronized, all clocks are in synchronism but each is phased differently from all others. Specifically, each clock lags its predecessor by one time slot and leads its successor by one time slot.

Following the synchronization sequence, the time slot program generators 18 in each telemetry module output data in time slots allocated thereto in accordance with the program in which time slots are generated by its respective generator 18. Desirably, each generator generates the time slot in accordance with the same program. Different programs may be used. The use of the same program is preferred since this allows each of the telemetry modules to be identical. The program is such that no two time slots overlap. Accordingly, no two data pulses overlap. The data pulses are shown in FIG. 3 as PFM pulses.

Data rate pulses at the data signal transmission frequency which may, for example, be 10 MHz, are produced by the local clock 16 in each telemetry module. Each clock outputs phased pulses to its time slot program generator 18. These pulses are offset (phased) by one time slot so that no two clocks output a pulse simultaneously. The data pulses in the TDM sequence, therefore, will not interfere with one another.

Consider for example, a large array which may be suitable for use in a seismic streamer or spread where there are fifteen sensors or groups of sensors which provide fifteen channels in each sub-array associated with each section. Consider also, that there are sixty sections, each with its own telemetry module. There are sixty different phase positions established by sixty second sync pulses. If, for example, (this is not the case illustrated in FIG. 3) the clock synchronization pulse (the first of the sixty second sync pulses) is transmitted in phase position 1 (the first time slot in a scan), then one acceptable program is to output and transmit data pulses from the section 1 or tail end section telemetry module in phase positions or time slots 2, 66, 130, 194, . . . 962, 2 . . . . This is the sequence in which the data pulse stream issues from the section 1 telemetry module output. The channel 1 data of section 1 is then transmitted in phase position 2. The channel 2 data of section 1 is transmitted in phase position 66. The channel 3 data of section 1 is transmitted in phase position 130 and so forth until all of the sub-array channels associated with section 1 are transmitted. The next to most distant clock 16 in the telemetry module of the next to most distant or section 2 telemetry module is delayed, (lags) the most distant clock by one second sync pulse (one time slot). Hence, with respect to the clock 16 of section 1, the clock in section 2 operates its generator 18 to output data in phase positions or time slots 3, 67, 131, 195, . . . 963, 3, . . . .

The data of the channels associated with section 2 follow the data associated with like ordered channels in section 1. This may be observed in the section 2 output wave form of FIG. 3, although the time slot numbers shown do not correspond to the numbers selected in this example. It will be seen that the data pulses follow one another and do not interfere. So far as the local time is concerned in the section 2 time slot program generator 18, it is, like the generator in the section 1 telemetry module, outputting in the same time slots, 2, 66, 130 . . . . exactly in the same sequence as the section 1 generator 18. Therefore, all time slot generators and clocks can be arranged with the same program, but because of the synchronization and offsetting of the time slots, the transmission of the data pulses is always in different time slots and the data samples never interfere with one another.

It is a feature of this invention, that the clock and time slot generator as well as the sync generator 24 may be implemented by digital circuitry which is readily available at low cost. As will be described in greater detail in connection with FIG. 2, the time slot program generator may be a six stage binary counter which is advanced at every clock phase angle, that is for each time slot in which data or sync pulses can be transmitted in the system. The states of this counter are decoded to enable the sampling of the submultiplex sub-array channel. For example, a single state of the counter can be decoded to provide for the sampling and transmission of data pulses in phase position or time slot 2 and every sixty-fourth time slot thereafter. By decoding different states of the counter, different programs of time slots for the transmission of data pulses may be generated. If the number of telemetry modules is not a power of two, suitable counters can be provided which can accommodate any number of telemetry modules.

To generalize, if the number of telemetry modules and sections is (N−4), and the number of channels in the sub-array which is submultiplexed is (n−1), then the counter which provides the time slot program generator 18 must count to at least N. It must repeat this count at least n times between synchronization intervals. A second counter in the sync generator 24 may be used to enable the time slot program generator counter to repeat its count of N, n times. Preferably, both (N and n) will be powers of 2, or powers of 10. Each counter is a recycling counter which recycles automatically. Such counters are commercially available as integrated digital circuit elements (chips). Either N or n can have any value so long as the states of the counters are decoded to obtain the correct total count before recycling occurs.

At the head end of the array, (the data collection or receiving point) the sequence during each scan will be as follows: A first sync pulse will be received. There will then follow a number of empty time slots which were occupied by second sync pulses equal in number to the number of sections in use but which are deleted in the course of synchronization of each module. If all of the possible sections (all 60 sections in the example given above) are not in use, there may appear possible second sync pulses. These are shown by the dash line pulses of half time slot duration at the beginning of the wave forms in FIG. 3. After the sync pulses, the data pulses begin, starting with the first channel from the tail end section, then the first channel from the next succeeding or second section and so forth—then repeating with the second channel from the first section, the second channel of the second section and so forth until the entire set of N channels has been scanned. This constitutes an entire scan of all of the channels, sometimes called a frame of the TDM sequence. Successive scans then repeat.

It will be observed that each data pulse arrives at the head end equipment within a well defined time slot, to within a small tolerance defined by the accuracy of the oscillator or generator of the clock 16 of the module at the tail end of the system which synchronizes all of the time slots in all of the sections. This is the case irrespective of the distance or propogation time between telemetry modules, and even if the distances the length of transmission length between modules is not equal. A single clock of the tail end module defines the data rate or sampling frequency for all of these channels. It is possible, if desired, to lock this clock to a master clock at the data collection point or head end. Then, another path of transmission from the master clock to the tail end clock will be used. It will be understood that the synchronization to a master clock is optional, since the synchronization pulses which are received at the head end may be used to time the demultiplexing of the data signals.

Reception of the synchronization pulses, and particularly the absence of presence of second sync pulses provides a continuous check on the integrity of the system. If the transmission links between sections should break, the first module on the side of the break closest to the head end of the system will in one scan interval, take over synchronization automatically and produce the synchronization pulses. The remaining telemetry modules then continue operation without interruption. The head end equipment receives information as to the location of the break by the locations of the second sync pulses.

Figure 2:
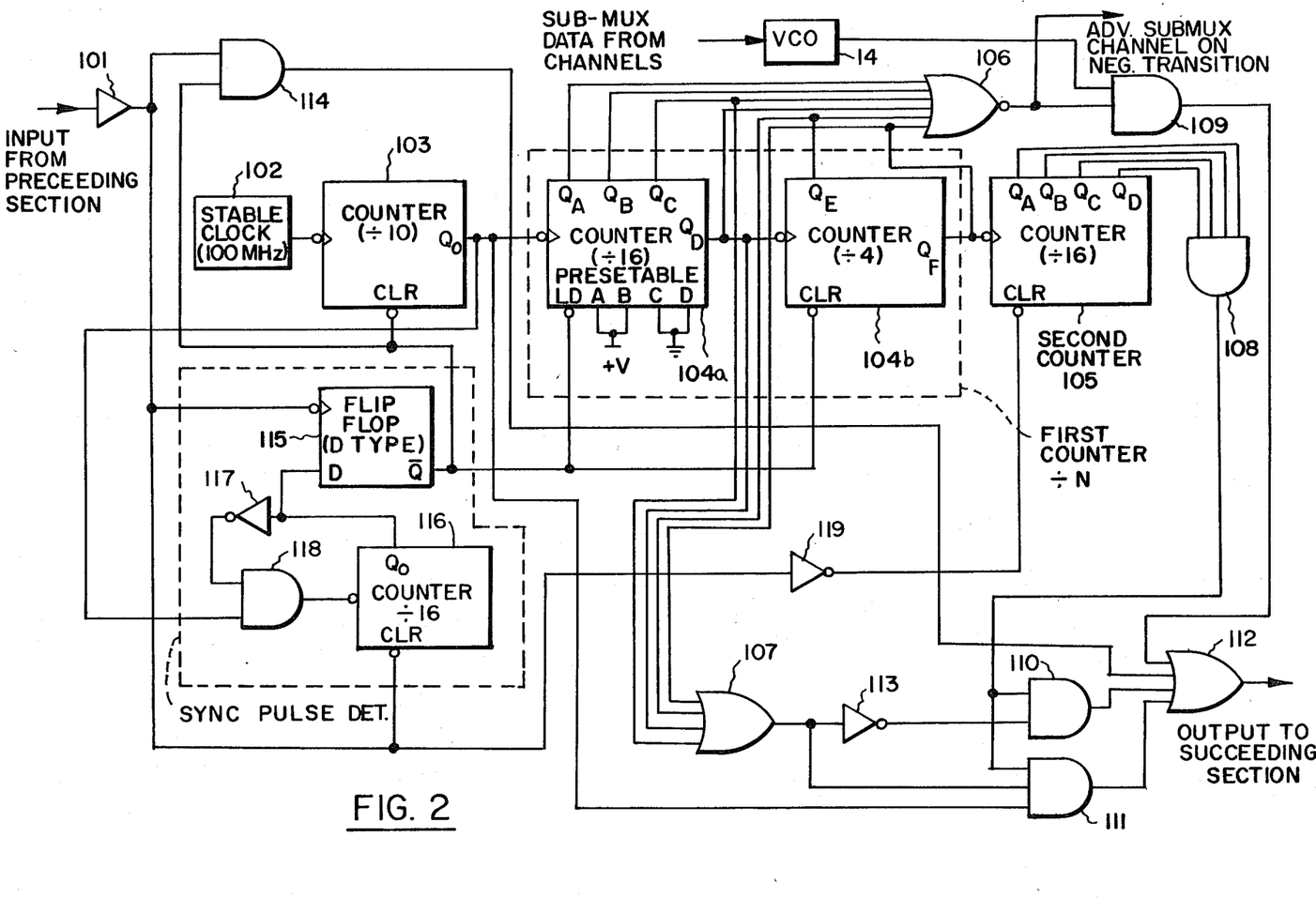
FIG. 2 is a more detailed block diagram illustrating an implementation of a telemetry section.

The system shown in FIG. 1 may be implemented by the digital logic shown in FIG. 2, the operation of which will be apparent from the following description when taken in connection with Table 1 below. Table 1 shows the time slots and corresponding states of counters 104 and 105 which provide the time slot program generator 18 and control the operation of the sync generator 24.

The input from the telemetry module of the preceding section is received by a line receiver 101. The output to the telemetry module of the succeeding section leaves from an OR gate 112. The module clock is made up of a stable clock oscillator 102 and a divider which divides by 10. The clock rate may be 100 MHz, which is divided by 10 in the counter 103 to provide a data rate or sampling frequency of 10 MHz. The period of the clock oscillator 102 is significantly shorter than the period of a time slot; the ratio being taken up by the counter 103. The ratio used in this example is 10. When the clock provided by the oscillator 102 and counter 103 is synchronized, the phase error, in terms of the period of a time slot, is less than half the pulse period of the clock oscillator 102, because the counter 103 is reset to reference phase asynchronously and then takes the phase of clock oscillator 102 at the next available transition of the pulses which it produces.

The counter 104 has a full count equal to or greater than four more than the number of sections and telemetry modules in the array. The counter 105 has a count equal to or greater than one more than the number of sensor channels (the number of channels in the sub-array). Counter 104 is a pre-setable counter in which a pre-selected binary number can be loaded in response to a load command to its LD input. The other counter 105 can be cleared in response to a clear command and is continuously cleared when data and sync signals are being received from the preceding section, via an inverter 119. It will be understood that all of the counters and flip-flops of the module have power up reset or clear connections (not shown) so that the system starts in reset or clear condition when it is turned on.

The zero state of the counter 104 is decoded by an NOR gate 106. This NOR gate provides the sampling pulse to the sampling gate 12, which is shown as an AND gate 109 in FIG. 2. The negative transition of the sampling pulse, which is outputted by the NOR gate 106, is used as the advance command to advance the submultiplex controller 10 to the next channel. An AND gate 108 decodes the full count state of the counter 105. Another OR gate 107 decodes the state xx00 . . . 00 of the counter 104. The AND gate 114 serves as the sync transmit control 28 (FIG. 1), and deletes a second sync pulse from the output to the succeeding section during the synchronization interval. The OR gate 112 combines the various input and locally generated sync and data pulses for transmission to the succeeding section.

The sync detector (22, FIG. 1) contains a counter 117 which divides by 16, an inverter 116, a D type flip-flop 115, and an AND gate 118. The sync detector detects the presence of a long (four time slot duration) first sync pulse. When no input signal from the preceding section is present, the flip-flop 115 is set so that the clear input of the counter 103, the load (LD) input of the counter 104 and the clear input of the counter 105 are not active. Thus, the counter 104 cycles continuously through its maximum count, which is, in this example, 63 (the first count being considered a 0 state of the counter). Counter 105 also cycles to a maximum count which in this example is 15 when the first count is considered to be a 0 state of the counter 105. The counter 104, which for convenience of implementation is made up of the divide by 16 counter 104a and the divide by 4 counter 104b, is the first counter of the system. The counter 105 is the second counter. Both counters, when running, count from 0 to 1023 or through 1024 counts.

The sequence of operation will be more apparent from Table 1 and FIG. 3. At counter 104 states 0, NOR gate 106 is inactive and its output goes high. The AND gate 109 then samples and produces the data signal or sample which is a PFM pulse obtained from the FM modulator, which is a voltage controlled oscillator (VCO 14). The data pulse generated by VCO 14 is applied to the OR gate 112. If all other inputs to the OR gate 112 are inactive, the data pulse is transmitted to the succeeding section. This is the primary transmission from this telemetry module. The same action will take place on all cycles through the count state of the counter 104. If the second counter 105 is active and the decoder gate 108 and the AND gates 110 and 111 are also active, they can override the data pulse in the OR gate 112. Thus, a data pulse is transmitted once each time the counter 104 passes through state 0 except when counter 105 is in its final state. For example, data pulses are transmitted in time slots 0, 64, 128, . . . , 896, as shown in FIG. 3, for the section 1 output.

When the second counter 105 reaches its final state, the AND gate 108 becomes active so that both AND gates 110 and 111 are enabled to respond to their other inputs. One or the other of these gates will be active depending upon the state of the OR gate 107. When OR gate 107 is active, the AND gate 111 has two high inputs and will therefore follow the clock output from the counter 103. When the OR gate 107 is inactive, the AND gate 110 is active by virtue of the counter 113 and the AND gate 110 presents a steady high state to the OR gate 112 which will transmit the high state of the first sync pulse from the module.

The OR gate 107 becomes active when the first counter 104 reaches a state of four, and remains active throughout the remainder of the full count of the counter 104. Thus, through counts 0 to 3, the OR gate 107 is inactive, and the AND gate 110 is active. A steady high level for the first sync pulse is then transmitted. Through the remainder of all clock phases during the synchronizing interval, the OR gate 107 is active and the AND gate 111 is also active, then second sync pulses of duration equal to one half a sync period are transmitted during each time slot. This output is shown as the section 1 output in FIG. 3.

Accordingly, in the absence of an input, if N is the number of sections, and (n−1) is the number of channels per section, then the section 1 module transmits data on clock phases or in time slot 0, N, 2N, . . . (n−2) N. During time slots (n−1)N, (n−1)N+1, (n−1)N+2, and (n−1)N+3, the steady high level, first sync pulse is transmitted. In all remaining time slots to (nN−1) a second sync pulse is transmitted.

Consider next operation of the module in the presence of an input signal. As long as the input signal is alterating or in the low state, the counter 116 is held in its cleared state. The flip-flop 115 is then in its reset state so that its $\overline{Q}$ output is high. This in turn enables the AND gate 114 so that incoming data or sync is transferred immediately to the output OR gate 112 and relayed to the succeeding section. When the first sync pulse occurs (the input signal goes steady high), the counter 116 is no longer held clear. It will begin counting since the inverter 117 will be holding the AND gate 118 enabled, and the pulses from the clock counter 103 are transmitted through the AND gate 118 to the input of the sync detector counter 116. When a count of two is reached, indicating the first sync pulse is being received, the $Q_B$ output of the counter 116 goes high. This disables its input via the inverter 117 and the AND gate 118 so that the count in the counter 116 stops. On the next negative going transition which is the end of the first sync pulse, the flip-flop 115 will change to the set state. Several events then take place:

1. The AND gate 114 is disabled, thereby preventing the transmission and deleting the first occurring second sync pulse.

2. The clock counter 103 is cleared and held, thereby stopping the transmission of the data rate clock pulses to the counter 104.

3. The first counter 104 is loaded; and

4. The second counter 105 is cleared.

Sometime later, on the next second sync pulse, if the module associated with the second section which is next to the tail end section, or N time slots later, if the module is associated with the same section nearest the head end of the array, a second sync pulse is received. The positive going transition of this pulse is midway through the time slot as shown in FIG. 3. At the end of the time slot, negative transition occurs. It will be noted that the first received second sync pulse is not transmitted. It is deleted and effectively erased because the AND gate 114 is disabled.

The negative transition of this first sync pulse which is received resets the flip-flop 115, since the counter 116 has already been cleared by the end of the first sync pulse thereby causing the D input of the flip-flop 115 to be low. When the flip-flop is reset, all of the counters are released and the module begins to run on the local clock pulses from the clock counter 103. However, the designated preset clock state is four, due to the loading of the two high states into the least bits of the counter 104. Hence, the counter 104 starts its count from the phase state of 4.

At the same time, the resetting of the flip-flop 115 reenables the AND gate 114. Therefore, the next second sync pulse and all following are transmitted through the module and out of the OR gate 112. It will be noted that the phase of the local clock pulses from the counter 103 is immaterial; the second sync pulses which originated in the outer most section are transmitted to each module with only a fixed propagation delay. The only action is that the first arriving second sync pulse is deleted. In summary, each telemetry module simply erases or deletes one of the phase pulses and resets its own clock to phase state four. Throughout the remainder of the scan, no steady high or first sync pulses are present, so that the sync pulse detector never again becomes active during the scan. Each module transmits in accordance with its own clock which is sufficiently stable to ensure that when data pulses are transmitted in state 0 of the counter 104, that it will be the only module transmitting data onto the data stream at that time and in that time slot.

TABLE I

Truth Table For Time Slots (Phase States)
When N = 64, n = 16

| Counter 104 $Q_AQ_BQ_CQ_DQ_EQ_F$ | Counter 105 $Q_AQ_BQ_CQ_D$ | TIME SLOT (Phase State) | Action |
|---|---|---|---|
| 000000 | 0000 | 0 | Data Transmitted |
| 000000 | 1000 | 64 | Data Transmitted |
| . | . | . | . |
| . | . | . | . |
| . | . | . | . |
| 000000 | 0111 | 896 | " |
| 000000 | 1111 | 960 | |
| 100000 | 1111 | 961 | Steady high (1st sync pulse |
| 010000 | 1111 | 962 | |
| 110000 | 1111 | 963 | |
| 001000 | 1111 | 965 | Second sync (Phase) pulses |
| . | . | . | |
| . | . | . | |
| 111111 | 1111 | 1023 | |

We claim:

1. In a telemetry system having a plurality of sections at which data is time division multiplexed and transmitted to a receiving point, the improvement comprising means for each of said sections for generating a sequence of time slots for transmissions of signals from all of said sections, means for each of said sections responsive to the reception of signals from a preceding section for synchronizing said time slots generated therein, with the time slot sequence of said preceding section in the sequence in which said sections are connected to each other, and means in each of said sections for the transmission of signals therefrom and from said preceding section or sections in time division multiplex relationship in different ones of said time slots.

2. The invention as set forth in claim 1 wherein said time slot generating means is operated to generate said time slots in successive groups one of which is for the transmission of synchronizing signals and the remainder of which is for data signals, said synchronizing means being responsive to the reception of said synchronizing signals, and said signal transmission means including means for transmitting synchronizing signals in said one group of time slots when synchronizing signals from preceding section are absent.

3. The invention as set forth in claim 1 wherein said sync signals are a plurality of successive synchronizing signals and a plurality of data signals, and said synchronizing means in each of said sections including means for synchronizing said time slot sequence generated therein with a different one of said synchronizing signals whereby to produce said time slot sequences in each of said sections offset in phase from each other corresponding to the phase relationship of said synchronizing signals.

4. The invention as set forth in claim 2 further comprising means in each of said sections for controlling the transmission of said synchronizing signals to enable said sections to be responsive to different ones of said synchronizing signals for synchronizing said time slot sequences in each of said sections in synchronism with different ones of said synchronizing signals.

5. The invention as set forth in claim 1 wherein each of said sections has means for submultiplexing signals from different ones of a plurality of channels, each in a different one of said time slots.

6. The invention as set forth in claim 5 wherein each of said plurality of channels has up to (n−1) of said channels therein, said system having N of said sections, each with said up to (n−1) channels connected thereto, said multiplexing means including means for transmitting a signal from a different one of said channels of its section in a different one of N groups of said time slots.

7. The invention as set forth in claim 6 wherein said submultiplexing means in each of said sections comprises a gate for selectively transmitting said signals from said plurality of channels which are connected thereto, means for enabling said gate upon occurrence of N of said time slots, and means for advancing the signals from different ones of said plurality of channels for transmission through said gate after said N time slots have occurred.

8. The invention as set forth in claim 3 wherein said time slots generating means comprises clock means for providing clock pulses at a rate at which each of said channels in said plurality of channels in each section is sampled, first recycling counter means having N states for counting said clock pulses, and second recycling counter connected in tandem with said first counter, to count up when said first counter recycles and having n states.

9. The invention as set forth in claim 8 wherein said synchronizing means comprises means responsive to said synchronizing signals for controlling the program of counting of said clock pulses in said first counter.

10. The invention as set forth in claim 9 wherein said synchronizing signal generating means comprises means operated by said second counter for enabling the transmission of clock pulses during a group of said time slots.

11. The invention as set forth in claim 10 wherein said synchronizing signal generating means further comprises means operating said first counter for transmitting a first sync pulse having the duration of a predetermined number of successive time slots in said group of time slots followed by a train of second sync pulses equal in number to the number of said sections in said system in successive ones of said time slots in said group.

12. The invention as set forth in claim 11 wherein said counting program controlling means of said sychronizing means comprises means responsive to the reception of said first sync pulse for enabling the one of said second sync pulses first to occur following first said sync pulse to initialize first said counter for starting said counting program.

13. The invention as set forth in claim 12 wherein said clock means comprises free running pulse generator means and a counter for dividing the repetition rate of said pulses from said pulse generator to provide said clock pulses, and means for initializing said counter which provides said clock pulses upon occurrence of said first to occur second sync pulse.

14. The invention as set forth in claim 13 wherein said signal transmission means includes means also responsive to the occurrence of said first to occur second sync pulse for deleting it from the train of second sync pulses for transmission to the succeeding one of said sections such that the next occurring of said second sync pulses becomes the first to occur second sync pulse for said succeeding one of said section and is operative to initialize said counter which provides said clock pulses and said first counter therein such that the time slot sequence in said succeeding one of said sections is synchronous with said time slot sequence in its preceding section and offset in phase by at least one time slot.

15. The invention as set forth in claim 14 wherein said free running generator is characterized as having a repetition rate which is stable to about an order of magnitude higher than one part in nN parts.

* * * * *